(12) United States Patent
Newman

(10) Patent No.: US 12,728,607 B2
(45) Date of Patent: Sep. 8, 2026

(54) APPARATUS AND METHODS FOR MOLDING RIGID OCULAR LENSES

(71) Applicant: MENICON CO., LTD., Nagoya (JP)

(72) Inventor: Stephen D. Newman, Singapore (SG)

(73) Assignee: Menicon Co., Ltd., Nagoya (JP)

( * ) Notice: Subject to any disclaimer, the term of this patent is extended or adjusted under 35 U.S.C. 154(b) by 1161 days.

(21) Appl. No.: 16/966,429

(22) PCT Filed: Jan. 31, 2019

(86) PCT No.: PCT/IB2019/050774
§ 371 (c)(1),
(2) Date: Jul. 30, 2020

(87) PCT Pub. No.: WO2019/150294
PCT Pub. Date: Aug. 8, 2019

(65) Prior Publication Data

US 2021/0031471 A1 Feb. 4, 2021

(30) Foreign Application Priority Data

Jan. 31, 2018 (SG) ........................... 10201800855R

(51) Int. Cl.
*B29D 11/00* (2006.01)
*G02C 7/04* (2006.01)
*B29L 11/00* (2006.01)

(52) U.S. Cl.
CPC .... *B29D 11/0048* (2013.01); *B29D 11/00038* (2013.01); *G02C 7/04* (2013.01); *B29L 2011/0041* (2013.01)

(58) Field of Classification Search
CPC .. B29D 11/0048; B29D 11/00038; G02C 7/04
See application file for complete search history.

(56) References Cited

U.S. PATENT DOCUMENTS 5,843,346 A 12/1998 Morrill
10,551,636 B2 2/2020 Wang et al.
(Continued)

FOREIGN PATENT DOCUMENTS

CN 1132488 A 10/1996
CN 104335104 A 2/2015
(Continued)

OTHER PUBLICATIONS

International Search Report and Written Opinion for International Application No. PCT/IB2019/050774 mailed May 14, 2019.
(Continued)

*Primary Examiner* — Mathieu D Vargot
(74) *Attorney, Agent, or Firm* — Dorsey & Whitney LLP

(57) ABSTRACT

One embodiment of a rigid gas permeable ocular lens may be formed by a process including forming a portion of a mold including a first side having a profile shaped to form an anterior surface of the rigid gas permeable ocular lens, applying a liquid lens material to the first side of the portion of the mold, and at least partially curing the liquid lens material to form the rigid gas permeable ocular lens. Methods of forming molds for rigid gas permeable ocular lenses, including molds for casting rigid gas permeable ocular lenses having a desired surface smoothness and desired dimensional tolerances are also provided.

11 Claims, 7 Drawing Sheets

(56) References Cited

U.S. PATENT DOCUMENTS

| | | | | |
|---|---|---|---|---|
| 2002/0163620 | A1 | 11/2002 | Miyamura et al. | |
| 2003/0175259 | A1* | 9/2003 | Karageozian | A61F 9/013 424/94.1 |
| 2005/0237481 | A1 | 10/2005 | Dean | |
| 2006/0255484 | A1* | 11/2006 | Plummer | B29D 11/00009 264/1.1 |
| 2008/0212021 | A1 | 9/2008 | Berke | |
| 2011/0085128 | A1* | 4/2011 | Liu | B29D 11/00038 264/1.36 |
| 2012/0026459 | A1 | 2/2012 | Tucker et al. | |
| 2013/0314665 | A1* | 11/2013 | Tung | G02C 7/047 351/159.37 |
| 2014/0035176 | A1 | 2/2014 | Hamilton | |
| 2015/0234204 | A1* | 8/2015 | Havenstrite | A61B 5/02 351/159.33 |
| 2016/0266404 | A1 | 9/2016 | Thompson | |
| 2017/0146819 | A1 | 5/2017 | Kobayashi et al. | |
| 2018/0210229 | A1 | 7/2018 | Wang et al. | |

FOREIGN PATENT DOCUMENTS

| | | | | |
|---|---|---|---|---|
| CN | 106461969 | A | 2/2017 | |
| JP | 2002350787 | A | 12/2002 | |
| JP | 2006043150 | A | 2/2006 | |
| JP | 2008112120 | A | 5/2008 | |
| JP | 2008112121 | A | 5/2008 | |
| JP | 2014134709 | A | 7/2014 | |
| JP | 2015197479 | A | 11/2015 | |
| JP | 2017142504 | A | 8/2017 | |
| WO | 9852090 | A1 | 11/1998 | |
| WO | WO 99/08147 | * | 2/1999 | |
| WO | 2010092686 | A1 | 8/2010 | |
| WO | WO-2012016097 | A2 * | 2/2012 | C07F 7/10 |
| WO | 2016196156 | A1 | 12/2016 | |
| WO | 2017016440 | A1 | 2/2017 | |
| WO | 2018204395 | A1 | 11/2018 | |
| WO | 2018212063 | A1 | 11/2018 | |
| WO | 2019031477 | A1 | 2/2019 | |

OTHER PUBLICATIONS

Extended European Search Report dated Sep. 17, 2021 as received in European Patent Application No. 19747738.3.

International Preliminary Report on Patentability for PCT/IB2019/050774 mailed Aug. 13, 2020.

First Office Action, Japan Application No. 2024-041868, dated Apr. 1, 2025.

* cited by examiner

APPARATUS AND METHODS FOR MOLDING RIGID OCULAR LENSES

BACKGROUND

Contact lenses, a subset of ocular lenses, are thin lenses that are placed directly on the surface of the eye. Ocular lenses are broadly classified into two types, soft ocular lenses, and hard or rigid ocular lenses. Soft ocular lenses are made from pliable and deformable materials, sometimes hydrogel materials, and may deform to take the shape of the surface of the eye when in use. In contrast, rigid gas permeable ocular lenses typically do not deform when placed on the eye, and in some cases, such as with orthokeratology lenses, may prompt the surface of the eye to conform to the shape of the lens itself. As a consequence, higher tolerances and manufacturing precision are needed for rigid lenses as compared to soft ocular lenses.

Originally, rigid gas permeable ocular lenses were made from rigid polymers such as poly(methyl methacrylate) (PMMA). However these rigid polymers were not sufficiently gas permeable, and did not allow environment oxygen to reach the surface of the eye through the lens, leading to a number of restrictions for the user. More recently, rigid lenses are made with oxygen permeable materials that allow for comfort and long durations of wear. In some cases, as long as or longer than soft contact lenses. These oxygen permeable rigid lenses are typically referred to as rigid gas permeable, or RGP lenses.

RGP lenses are manufactured by lathing or lathe cutting. This process involves affixing the lens material in the form of a button to a rotating mount and sculpting away excess material to form the desired surface geometry. Lathing processes, plus a number of post lathe honing and polishing processes, are able to achieve the tolerances and precisions required for comfortable RGP lenses, especially for lenses such as orthokeratology lenses, which can reshape the eye and which require incredibly high tolerances. However, lathing can produce excess waste as material is removed to form the lens. Lathing can also be slow and expensive on a per lens basis, as each ocular lens must be individually lathed. Further, lathing can result in inconsistencies between lenses and is limited to rotationally symmetric geometries.

Soft lenses, on the other hand, are typically manufactured by casting processes, such as cast molding or spin casting, which are relatively inexpensive, quick, repeatable, and can produce high volumes of lenses with relatively few imperfections. With these casting processes, molds are formed having the desired lens shape, and these molds are then used to form a lens with the desired shape and profile by casting liquid monomers in the molds. However, soft contact lenses can be manufactured with much looser tolerances, when compared to RGP lenses, because once hydrated they are pliable and conform to the surface of the user's eye, thereby minimizing the effect of most molding imperfections.

Accordingly, there is a need to quickly, efficiently, reliably, and cheaply manufacture rigid gas permeable ocular lenses.

SUMMARY

According to some embodiments, a rigid gas permeable ocular lens may be formed by a process including forming at least a portion of a mold including a first side having a profile shaped to form an anterior surface of the rigid gas permeable ocular lens, applying a liquid lens material to the first side of the portion of the mold, and at least partially curing the liquid lens material to form the rigid gas permeable ocular lens, wherein at least one surface of the rigid gas permeable ocular lens has an Ra roughness of less than about 5 nanometers.

In some embodiments, the process further comprises cast molding the liquid lens material to form the rigid gas permeable ocular lens.

In some embodiments, the portion of the mold does not require polishing prior to forming the rigid gas permeable ocular lens.

In some embodiments, at least partially curing the liquid lens material includes exposing the liquid lens material to actinic radiation.

In some embodiments, forming at least the portion of the mold including the first side having the profile shaped to form the anterior surface of the rigid gas permeable ocular lens includes machining a tool steel blank to form a male injection mold tooling having a surface corresponding to the anterior surface of the ocular lens, and injection molding the portion of the mold using the male injection mold tooling to form the portion of the mold including the first side having the profile shaped to form the anterior surface of the rigid gas permeable ocular lens.

In some embodiments, machining the blank includes using a lathe having a positioning resolution of less than about 10 nanometers.

In some embodiments, machining the blank includes using a multi-axis mill having a positioning resolution of less than about 10 nanometers.

In some embodiments, the rigid gas permeable ocular lens comprises a rigid gas permeable ocular lens.

In some embodiments, the rigid gas permeable ocular lens is an orthokeratology lens.

In some embodiments, a radius of curvature of a back optic zone of the rigid gas permeable ocular lens has a dimensional tolerance equal to or less than about 0.05 millimeters.

In some embodiments, the rigid gas permeable ocular lens deforms the surface of an eye of the user.

In some embodiments, a method of forming a rigid gas permeable ocular lens includes forming at least a portion of a mold including a first side having a profile shaped to form an anterior surface of the rigid gas permeable ocular lens, applying a liquid lens material to the first side of the portion of the mold, and at least partially curing the liquid lens material to form the rigid gas permeable ocular lens.

In some embodiments, at least one surface of the rigid gas permeable ocular lens has an $R_a$ roughness of less than about 5 nanometers.

In some embodiments, the method further includes cast molding the rigid gas permeable ocular lens.

In some embodiments, at least a portion of the mold is free of polishing prior to forming the rigid gas permeable ocular lens to produce the rigid gas permeable ocular lens with the $R_a$ roughness of less than about 5 nanometers.

In some embodiments, at least partially curing the liquid lens material includes exposing the liquid lens material to actinic radiation.

In some embodiments, forming at least the portion of the mold includes providing a mold material, machining the blank to form a male injection mold tooling having a surface corresponding to the anterior surface of the ocular lens, and injection molding the portion of the mold using the male injection mold tooling to form the portion of the mold including the first side having the profile shaped to form the anterior surface of the rigid gas permeable ocular lens.

In some embodiments, machining the blank includes using a multi-axis milling machine having a positioning resolution of less than about 10 nanometers.

In some embodiments, the rigid gas permeable ocular lens is an orthokeratology lens.

In some embodiments, a radius of curvature of a back optic zone of the rigid gas permeable ocular lens has a dimensional tolerance equal to or less than about 0.005 millimeters.

In some embodiments, the rigid gas permeable ocular lens is configured to deform a surface of an eye of the user.

In some embodiments, the liquid lens material is an isotropic material having a viscosity of greater than 5,000 cps at 20° C., and the rigid gas permeable ocular lens has a modulus greater than 500 Mpa.

A method of forming a rigid gas permeable ocular lens includes providing a mold including a first side having a profile shaped to form an anterior surface of the rigid gas permeable ocular lens, dispensing a liquid lens material to the first side of the portion of the mold, the liquid lens material including an isotropic material having a viscosity of greater than 5,000 cps at 20° C., and at least partially curing the liquid lens material to form the rigid gas permeable ocular lens, wherein the rigid gas permeable ocular lens has a modulus greater than 500 Mpa.

In some embodiments, the rigid gas permeable ocular lens is an orthokeratology lens.

In some embodiments, the rigid cast permeable ocular lens includes a cast molding the rigid gas permeable ocular lens.

A molded rigid gas permeable ocular lens includes a molded lens body including an anterior surface and a posterior surface, wherein the rigid gas permeable ocular lens has a modulus greater than 500 Mpa and a $D_k$ of greater than 100.

In some embodiments, the molded rigid gas permeable ocular lens is an orthokeratology lens.

In some embodiments, the molded rigid gas permeable ocular lens includes an optic zone, a reverse zone, an alignment zone, and a peripheral zone formed on the anterior surface of the molded lens body.

In some embodiments, the lens is cast molded.

In some embodiments, the lens body has a varying thickness from approximately 10 μm to over 80 μm.

In some embodiments, the lens is configured to be secured to a cornea and define an apical clearance between the posterior surface and the cornea of between 5 μm and 40 μm.

The Summary is provided to introduce a selection of concepts in a simplified form that are further described below in the Detailed Description. The Summary and the Background are not intended to identify key concepts or essential aspects of the disclosed subject matter, nor should they be used to constrict or limit the scope of the claims. For example, the scope of the claims should not be limited based on whether the recited subject matter includes any or all aspects noted in the Summary and/or addresses any of the issues noted in the Background.

BRIEF DESCRIPTION OF THE DRAWINGS

The accompanying drawings illustrate various embodiments of the principles described herein and are part of the specification. The illustrated embodiments are merely examples and do not limit the scope of the claims.

Throughout the drawings, identical reference numbers designate similar, but not necessarily identical, elements.

DETAILED DESCRIPTION

Rigid gas-permeable ocular lenses, specifically contact lenses, require a high degree of precision during their manufacture, in order to achieve desirable dimensional tolerances and desirable surface smoothness. The principles described in the present disclosure include a rigid gas permeable ocular lens formed from a mold by a casting process. In one example, the casting process is a cast molding process. The principles described herein also include methods and associated components for making such a mold, for example by cast molding, spin casting, or other molding methods.

Figure 1A:
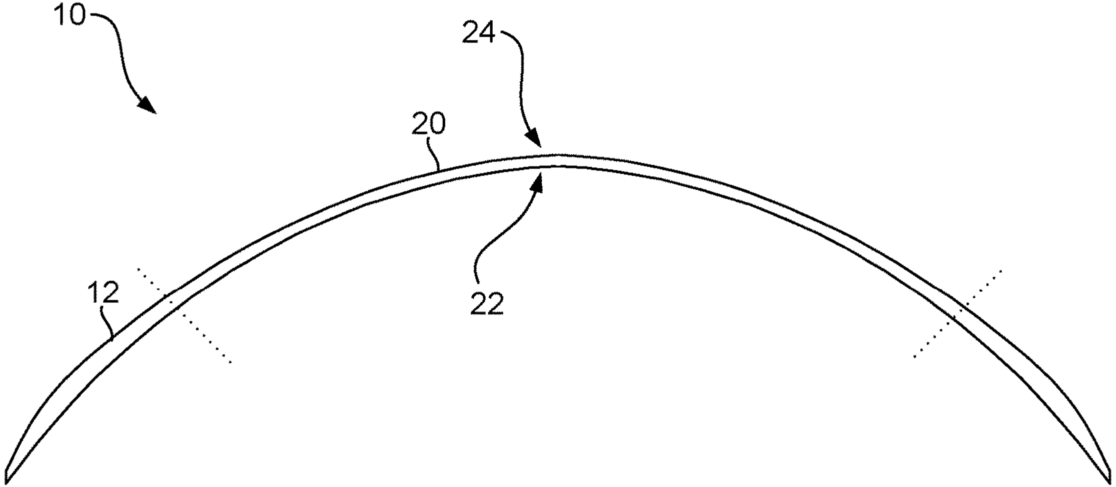
FIG. 1A is a cross-sectional view of an embodiment of a rigid gas permeable ocular lens formed according to the principles of the present disclosure.

FIG. 1A is a cross-sectional view of one embodiment of a rigid ocular lens 10, such as a rigid gas permeable ocular lens, formed according to the processes described herein. In some embodiments, the rigid gas permeable ocular lens may include an optic zone 20 that is configured to focus light passing through the optic zone on the retina of a user. The optic zone 20 is positioned in front of the eye's pupil. Often, the non-optic region 12 circumscribes the optic zone 20 and makes up the remainder of the ocular lens 10. This non-optic region 12 may be positioned over the iris and, in some cases, portions of the conjunctiva and sclera of the eye. In some embodiments, the rigid gas permeable ocular lens is formed according to the methods and processes described in the present disclosure and may be used in orthokeratology. Often, in orthokeratology lenses, the rigid contact lens is only engaged with the cornea. In some embodiments, the rigid gas permeable ocular lenses may not substantially deform when placed on the eye, and in some cases, such as with orthokeratology lenses, may deform the surface or profile of the eye to conform to the shape of the lens itself and may only be positioned over the cornea of the eye.

The rigid gas permeable ocular lens 10 may have a posterior or back surface 22 and an anterior or front surface 24. The shape of the back surface 22 of the optic zone 20 may be described by a radius of curvature or any number of non-rotationally symmetric geometries. In some embodiments, the rigid gas permeable ocular lens 10 has a thickness of approximately 0.01 mm to approximately 0.14 mm. The thickness of the ocular lens 10 can vary at different locations on the ocular lens 10. For example, the ocular lens 10 can be thicker or thinner near the outer edge of the ocular lens 10, when compared to the central region of the lens.

The rigid gas permeable ocular lenses formed according to the methods and processes described herein can be made from any material suitable for use in rigid contact lenses. In some embodiments, rigid gas permeable ocular lens is a rigid gas permeable ocular lens, and accordingly, the rigid gas permeable ocular lens may be formed from gas permeable or oxygen permeable materials. In some embodiments, a rigid gas permeable ocular lens may include a polymer material. For example, in some embodiments a rigid gas permeable ocular lens may include a siloxane material. In some embodiments, a rigid gas permeable ocular lens may include an acrylate material. In some embodiments, a rigid gas permeable ocular lens may include cellulose acetate butyrate, siloxane acrylates, t-butyl styrene, fluoromethacrylate, flurosiloxane acrylates, perfluroethers, flouro silicones, tisilfocon A ($C_{57}H_{83}F_6NO_{14}Si_4$), other types of polymers, or combinations thereof. These materials may include various combinations of monomers, polymers, and other materials to form the final polymer. For example, common components of these materials may include HEMA, HEMA-GMA, and the like.

In some embodiments, a rigid gas permeable ocular lens formed according to the methods and processes described herein may have physical features which distinguish such a lens from rigid gas permeable ocular lenses formed according to other, known methods. For example, in some embodiments, a rigid gas permeable ocular lens formed according to the present exemplary methods and processes described herein may have a lower average surface roughness ($R_a$) than a rigid gas permeable ocular lens formed from a known lathing process. For example, in some embodiments at least one of the anterior and/or posterior surface of a rigid gas permeable ocular lens may have a surface with an $R_a$ surface roughness of less than about 15 nanometers, less than about 10 nanometers, less than about 5 nanometers, less than about 4 nanometers, less than about 3 nanometers, less than about 2 nanometers, or less that about 1 nanometer or less.

In some examples, a rigid gas permeable ocular lens formed according to the methods and processes described herein may have dimensional tolerances less than or equal to the dimensional tolerances for rigid gas permeable ocular lenses prescribed by the ISO. In some embodiments, a rigid gas permeable ocular lens may have a dimensional tolerance of less than about 0.009 millimeters, less than about 0.007 millimeters, less than about 0.006 millimeters, less than about 0.005 millimeters, less than about 0.004 millimeters, less than about 0.003 millimeters, or less than about 0.002 millimeters or less. As noted above, traditional soft contact lenses are acceptable if manufactured with tolerances around 0.2 millimeters. In contrast, the present exemplary rigid gas permeable ocular lenses manufactured according to the present exemplary systems and methods are manufactured with tolerances in the plus or minus approximately 3-5 microns.

Figure 1B:
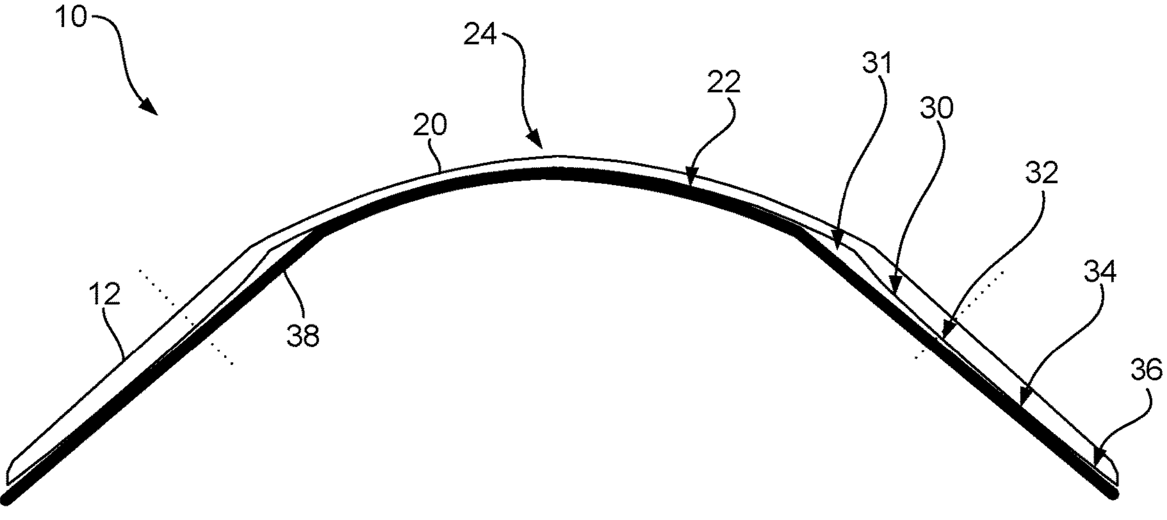
FIG. 1B is a cross-sectional view of an embodiment of a rigid gas permeable ocular orthokeratology lens disposed on an eye, according to the principles of the present disclosure.

FIG. 1B illustrates an embodiment of a rigid gas permeable ocular orthokeratology (orthoK) lens 10 disposed on an eye 38, according to one exemplary embodiment. As shown, the back surface 22 of the optic zone 20 or center of the lens, which is typically between 5.0 mm and 6.8 mm in diameter overlies what can be considered a treatment zone on the cornea. The base curve or back optic zone radius of the back surface 22 is designed based on the amount of central corneal flattening desired related to the corneal curvature, according to the desired myopia treatment. The radius can be chosen using a lens design calculation called the Jessen Formula. The theory assumes that there is a linear relationship between myopia reduction and base curve selection. In other words, if the cornea had a flat K reading of 42.00 D and an Rx of −2.00 D, you fit a 40.00 D base curve which would change the corneal curvature and therefore the refraction by the required amount. According to the Jessen Formula, the amount of myopia correction desired is identified, known as the target prescription. The flat corneal meridian is then identified in dioptric power and the base curve or back optic zone radius is then made flatter than the flat corneal meridian by the target prescription plus an additional amount known as the Jessen Factor, which may range from approximately 0.50 D to about 3.00 D. The Jessen Factor is added to ensure that the desired treatment amount is achieved and maintained throughout the day, as the lens is removed and the cornea relaxes.

The orthokeratology lens can be designed to have a desired apical clearance under the base curve in the rage from 1 μm to 50 μm, preferably from 5 μm to 40 μm, and more preferably from 15 μm to 25 μm, with a lower apical clearance having more effect.

Additionally, as illustrated in FIG. 1B, the orthokeratology lens includes a reverse zone 30, a relief zone 32, an alignment zone 34, and a peripheral zone 36. The reverse zone connects the base curve or back optic zone radius to the relief zone 32. As shown, the reverse zone is steeper than its adjacent curves and can include a curve, a spline, a number of tangents, and similarly designed linear reorientations. The reverse zone 30 defines a tear film reservoir 31, whose depth can correspond to the amount of myopia being corrected. For low levels of correction, the tear film reservoir 31 can be shallower, while high levels of correction typically have a deeper tear film reservoir 31. The tear film reservoir 31 can vary from less than about 10 μm to about 80 μm, or more. The reverse zone 30 can raise or lower the base curve to effect the desired apical clearance. A steep reverse zone 30 will increase the apical clearance, while a relatively flat reverse zone can reduce or sometimes eliminate the apical clearance. Precise formation of the reverse zone avoids an excessively steep reverse zone (resulting in excessive apical clearance and a topographical center island) or an excessively flat reverse zone (resulting in the lens engaging on the conical apex, rather than the corneal periphery, resulting in lens de-centration and a decentered treatment pattern).

As shown, a relief zone 32 can connect the reverse zone 30 to the alignment zone 34. The relief zone 32, if present, is intended to encourage the migration of epithelial cells from the alignment zone 34 toward the tear film reservoir. In some instances, the relief zone 32 can vary in width from 0.4 mm to approximately 0.8 mm, with a depth or thickness from approximately 10-20 μm.

The alignment zone 34 establishes a location point of touch (landing) for the orthokeratology lens 10 and can be spherical, aspheric, or tangent. According to one embodiment, the alignment zone may be slightly aspheric to accommodate a wider range of patients. The fit of the alignment zone 34 contributes to proper lens centration and is where the lens lands on the eye.

Adjacent to the alignment zone 34, a peripheral zone 36 any number of edge geometries can be formed to create an appropriate edge lift at the peripheral cornea. The peripheral zone 36 can have a width from 0.1 mm to 0.6 mm, and may have a thickness from approximately 80-100 μm.

The design and selective variation of each of the above-mentioned zones and curves can be varied, depending on the aggressiveness of the desired treatment.

Figure 2A:
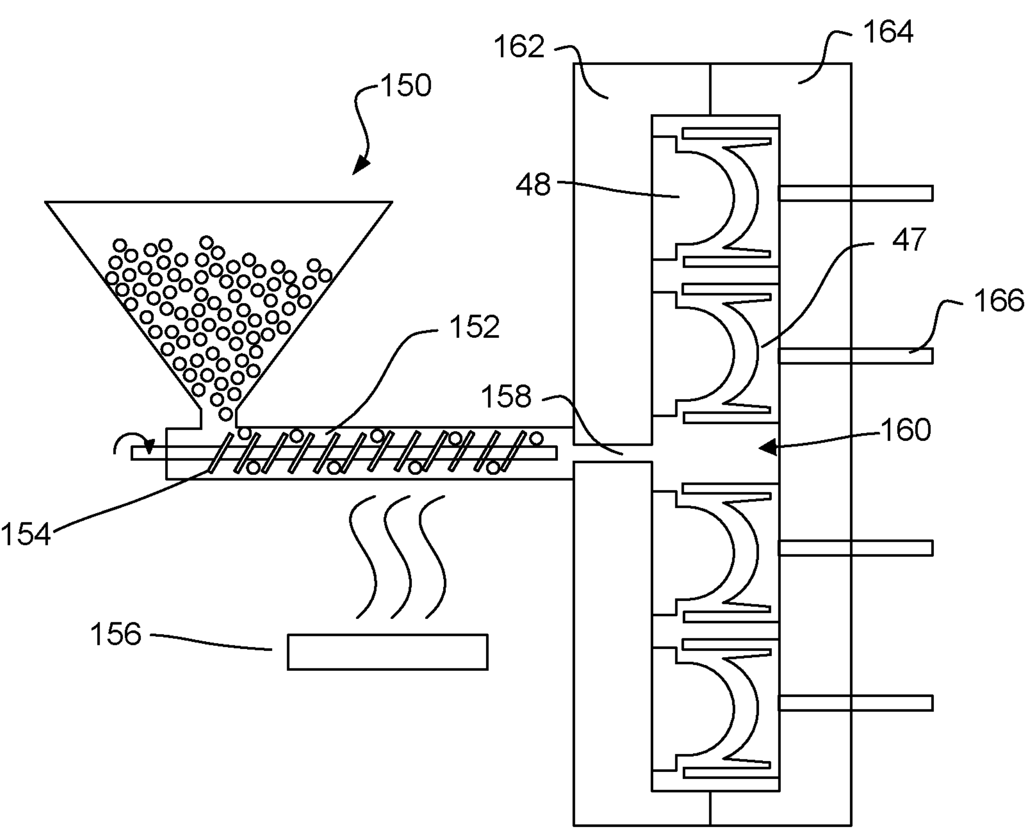
FIGS. 2A-2C are cross-sectional views of a method for forming a mold for casting a rigid ocular lens, according to the principles of the present disclosure.
Figure 2B:
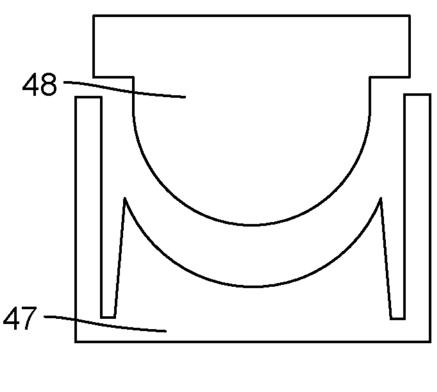
Figure 2C:
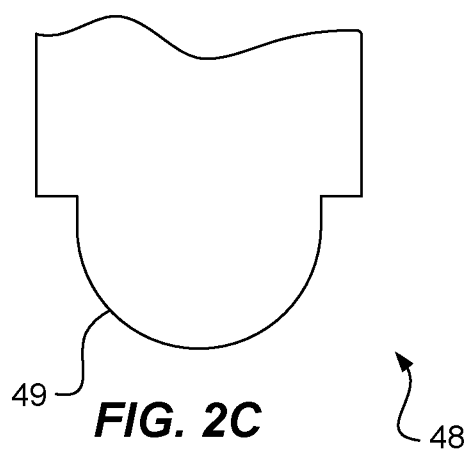

FIGS. 2A-C illustrate various components that can be used in certain examples for forming a rigid gas permeable ocular lens 10, according to the present exemplary system and method. While the present exemplary systems and methods are described below primarily in the context of a cast molded ocular lens formed in a two-part cast mold, the present systems and methods may also be applied to lenses manufactured from spin casting, cast molding, and/or other forms of molding or casting contact lenses.

With reference to mold cast contact lenses, the shape of the anterior and posterior surfaces of the lens is typically designed into a mold used in the manufacture of the lens. FIG. 2A is a cross-sectional view of one embodiment of making molds for the production of rigid gas permeable ocular lenses 10, according to the principles of the present disclosure. In this example, an injection molding process is used to form the mold that are subsequently used to form the rigid gas permeable ocular lenses 10. As shown, a standard injection molding machine may be used to form the molds. Specifically, material for the molds is fed through a funnel 150 or other material reservoir to a material feed line 152. The material feed line 152 may include a screw 154, an auger, or another type of mechanism that is configured to move the molding material along the length of the material feed line 152. Additionally, a heating element 156 is applied to the material feed line to melt or at least soften the molding material as the molding material is passed through the material feed line 152. At a nozzle 158 of the material feed line 152, the molding material is extruded into a cavity 160 collectively formed by a first part 162 and a second part 164 of an injection molding housing.

As illustrated in FIGS. 2A and 2B, the cavity 160 includes male mold tooling 48 and female mold tooling 47 that are respectively aligned with one another. According to one embodiment, the male mold tooling 48 and the female mold tooling 47 are made of tool steel. The extrusion pressure of the molding material entering the cavity 160 causes the molding material to fill all of the void space within the cavity 160, including the space between the male mold tooling 48 and female mold tooling 47. The geometry of the male mold tooling 48 and female mold tooling 47 is transferred to the resulting cast molds for casting the ocular lens 10. As illustrated in FIGS. 2B and 2C, male mold tooling 48 of the casting mold may have a surface 49 corresponding to the anterior surface of the rigid gas permeable ocular lens 10 to be formed. Further, the surface 49 of the male mold tooling 48 may have a surface roughness and/or dimensional tolerances of the same degree as the rigid gas permeable ocular lens 10 to be formed.

Similarly, the injection molding process illustrated in FIGS. 2A-2C can be used to form the male mold portion of the cast mold system, including a surface that defines the posterior surface of the desired rigid gas permeable ocular lens 10.

To generate the surface 49, the male mold tooling 48 is precisely machined, or lathed, to match the features desired on the final rigid gas permeable ocular lens to be produced, according to the present exemplary system and methods. Similarly, the surface of a corresponding female mold tooling is precisely formed to define the desired posterior surface of the final rigid gas permeable ocular lens. As the lathed surface 49 of the male mold tooling 48 ultimately corresponds to the formed anterior surface of a rigid gas permeable ocular lens 10, the lathed surface of the male mold tooling 48 may be formed by a lathing process capable of precision and smoothness of at least the same degree as desired in the rigid gas permeable ocular lens 10.

A precise machining and forming methodology can be used to form the male mold tooling including, but in no way limited to, DAC ophthalmic lathes, Optoform ophthalmic lathes, FTS tooling, 5-axis diamond milling, 3-dimensional nano-printing, nanolithography, fused deposition, and the like. In some embodiments, the male mold tooling 48 may be formed by a computer controllable lathe or multi-axis mill, such as an Optoform ultra-precision lathe (models 30, 40, 50, and/or 80), available from Sterling Ultra Precision, located at 8600 Somerset Drive, Largo, Florida. In some embodiments, the machine used to form the male mold tooling 48 may have a positioning resolution of 10 nanometers or less. In some embodiments, the lathing and/or milling process is precise enough that the male mold tooling 48 has the desired surface characteristics to form a rigid gas permeable ocular lens 10 as described herein without additional treatment of the male mold tooling 48, such as grinding or polishing. In other embodiments, the male mold tooling 48 receives additional surface finish treatments, including but in no way limited to, grinding, polishing, lapping, honing, or superfinishing.

After the molding material has had a sufficient time to harden within the cavity 160, the first part 162 and the second part 164 are separated, and the molds are removed via ejector pins 166, thereby producing the female mold component of a desired cast molding system. Similarly, the male mold component of the desired cast molding system may be formed and ejected from the injection molding apparatus.

Although in some embodiments, a mold, or a portion of the mold, may be formed by a lathing and injection molding process, for example as described with respect to FIGS. 2A-C, in some embodiments, a mold may be formed by directly lathing or machining a mold blank to produce a profile shaped to form the anterior surface of the rigid gas permeable ocular lens 10, for the female portion of the cast mold system, or the posterior surface of the gas permeable ocular lens, for the male portion of the cast mold system. Similarly, because the machined surface of the mold may form the anterior surface of a rigid gas permeable ocular lens 10, the machined surfaces of the mold tooling 48 may be formed by a lathing or milling process capable of precision and smoothness of at least the same degree as desired in the rigid gas permeable ocular lens 10.

Figure 3:
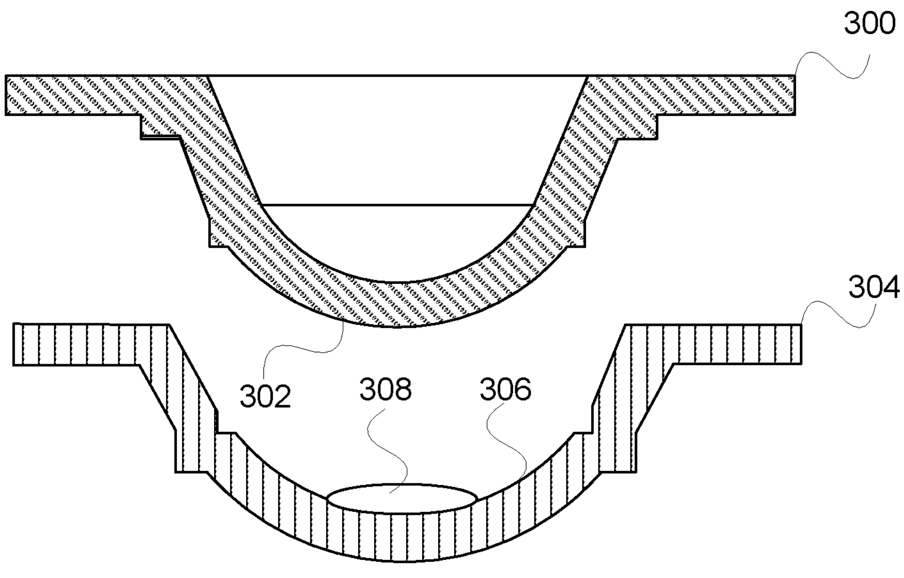
FIG. 3 is a cross-sectional view of one embodiment of a cast molding system for forming an ocular lens, according to the principles of the present disclosure.

FIG. 3 is a cross-sectional view of one embodiment of a cast molding system for casting a rigid gas permeable ocular lens 10 formed according to the principles of the present disclosure. As illustrated, the cast molding system includes a male mold member 300, having a convex posterior forming surface 302 that defines the geometry and surface finish of the posterior surface of the contact lens cast therein. Similarly, the cast molding system includes a female mold member 304 having a concave anterior forming surface 306 that defines the geometry and surface finish of the anterior surface of the contact lens cast therein. As illustrated in FIG.

3, a liquid RGP lens material can be disposed within the concave surface of the female mold member 304.

As described above, in some embodiments, the posterior forming surface 302 and the anterior forming surface 306 of the male mold member 300 and female mold member 304 can have a smoothness and dimensional tolerances of the same degree as the desired formed rigid gas permeable ocular lens 10. That is, in some examples, the male mold member 300 and the female mold member 304 can have a dimensional tolerance for the posterior forming surface 302 and the anterior forming surface 306 of less than about 0.009 millimeters, less than about 0.007 millimeters, less than about 0.006 millimeters, less than about 0.005 millimeters, less than about 0.004 millimeters, less than about 0.003 millimeters, or less than about 0.002 millimeters or less. In some embodiments, the profile of the posterior forming surface 302 and the anterior forming surface 306 can have a surface with an $R_a$ surface roughness of less than about 15 nanometers, less than about 10 nanometers, less than about 5 nanometers, less than about 4 nanometers, less than about 3 nanometers, less than about 2 nanometers, or less that about 1 nanometer or less. Further, in some embodiments, the above-stated smoothness and dimensional tolerances may be achieved in the mold tooling 48 directly from the lathing or machining process, and may not involve further treatment, grinding, or polishing to achieve. The precision achieved via the lathing process thus may result in fewer processing steps, lower waste, quicker processing and mold formation times, and ultimately reduced costs for the formed rigid gas permeable ocular lenses 10 compared to traditional processes, such as lathing the surface of rigid gas permeable ocular lenses directly.

Figure 4:
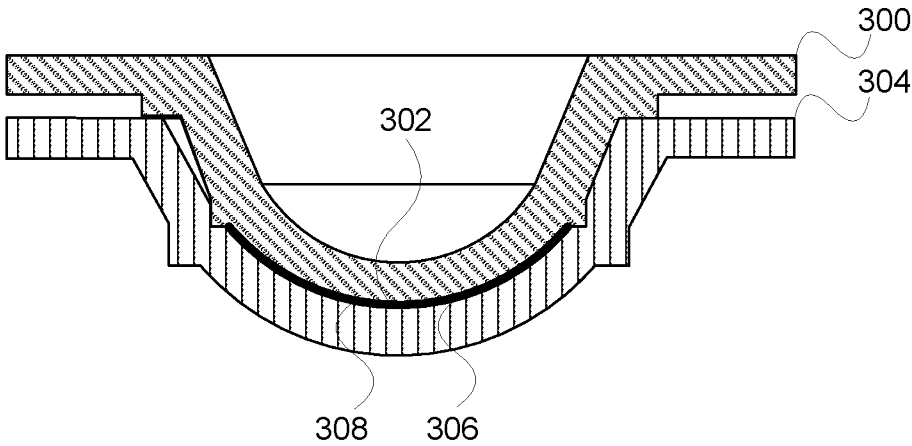
FIG. 4 is a cross-sectional view of one embodiment of a cast molding system for forming an ocular lens, according to the principles of the present disclosure.

FIG. 4 is a cross-sectional view of an assembled cast molded system with a liquid lens material 308 disposed between the male mold member 300 and the female mold member 304 to conform to the posterior forming surface 302 and the anterior forming surface 306, according to the principles of the present disclosure. In this example, the liquid lens material 308 is deposited into the profile concave surface of the female mold member 304 and engaged by the posterior forming surface 302 during assembly.

The liquid lens material 308 can be made from any material suitable for use in rigid gas permeable ocular lenses. For example, the liquid lens material 308 can be made of any material that is rigid and gas or oxygen permeable when cured, polymerized, or hardened. In some embodiments, the liquid lens material 308 may include a polymer material. In some embodiments, the liquid lens material 308 may include siloxane material. In some embodiments, liquid lens material 308 may include an acrylate material. In some embodiments, liquid lens material 308 may include cellulose acetate butyrate, siloxane acrylates, t-butyl styrene, flurosiloxane acrylates, perfluroethers, other types of polymers, or combinations thereof. These materials may include various combinations of monomers, polymers, and other materials to form the final polymer. For example, common components of these materials may include HEMA, HEMA-GMA, and the like.

The liquid lens material 308 is suitable to mold from a soft material to a rigid non-zero gel final product. According to one embodiment, the liquid pre-polymerized lens material can have a viscosity between 10 and more than 10,000 centipoise (cps), between 100 and 8,000 cps, between 1,000 and 5,000 cps, or more than 5,000 cps at 20° C. The liquid pre-polymerized lens material 308 is relatively viscous, but not so viscous so as to distort the male mold member 300, which would introduce bubbles or distort the desired RGP lens. Additionally, the liquid lens material 308 can be configured to flow and mold in an isotropic form, to maintain the designed dimensional effects. Specifically, the liquid lens material 308, shrinks or expands in an isotropic fashion, allowing the designed dimensional effects to be maintained through the polymerization process as well as when experiencing shrinkage during prolonged use. Non-isotropic shrinkage and dimensional distortion historically discouraged the molding of rigid gas permeable ocular lenses. The resulting polymerized material forming the rigid gas permeable ocular lens can have a modulus of at least 500 Mpa, and can be greater than 800 Mpa. Modulus can be measured according to ASTM D-1708a, employing an Instron (Model 4502) instrument where the polymer sample is immersed in borate buffered saline; an appropriate size of the sample is gauge length 22 mm and width 4.75 mm, where the sample further has ends forming a dog-bone shape to accommodate gripping of the sample with clamps of the Instron instrument, and a thickness of 200+50 microns The resulting rigid gas permeable ocular lens 10 can be shaped and sized based on a variety of factors, including the shape and size of the user's eye and various optical properties or surface manipulating forces to be achieved by the ocular lens. The total thickness of the ocular lens 10 can be approximately 0.1 mm to approximately 0.14 mm. The thickness of the ocular lens 10 can gradually vary at different locations on the ocular lens 10. For example, the ocular lens 10 can be thicker near the outer edge of the ocular lens 10 than in the optic zone, and vice versa.

Once the liquid lens material 308 is applied to the female mold member 304 and the male mold member 300 is engaged, the liquid lens material 302 may then be exposed to a curing agent (such as temperature, actinic radiation, or another type of curing agent, or combinations thereof) until cured. As a result, the liquid lens material 302 forms the rigid gas permeable ocular lens 10 having an anterior surface corresponding to the shape of the anterior forming surface 306 of the female mold member 304 and a posterior surface corresponding to the shape of the posterior forming surface 302 of the male mold member 300. Once the rigid gas permeable ocular lens is cured, it can be removed.

Advantageously, a rigid gas permeable ocular lens 10 formed according to the methods and processes described herein may have a surface smoothness that is higher than rigid gas permeable ocular lenses formed by other methods, such as by lathing. For example, in some embodiments at least one of the anterior and/or posterior surface of a rigid gas permeable ocular lens may have a surface with an $R_a$ surface roughness of less than about 15 nanometers, less than about 10 nanometers, less than about 5 nanometers, less than about 4 nanometers, less than about 3 nanometers, less than about 2 nanometers, or less that about 1 nanometer or less.

The processes described herein may also result in the formation of rigid gas permeable ocular lenses 10 with a reduced amount of surface and interstitial imperfections as compared to a rigid gas permeable ocular lens formed by traditional methods, such as, a lathing process. Smoothness and lack of defects are especially crucial characteristics for the posterior surface of a rigid gas permeable ocular lens 10, because the posterior surface directly contacts the eye of a user, and accordingly, may cause irritation or discomfort for the user if the surface is too rough or contains defects, and may be a surface configured to impart reshaping forces on the surface of the eye.

As compared to the typical manufacturing processes for forming rigid gas permeable ocular lenses, such as lathing, casting allows for the formation of multiple rigid gas permeable ocular lenses simultaneously, and allows for repeatability. These simultaneously formed lenses may have different geometries and may even be formed from different materials relative to one another. The formation time for each lens is also typically shorter than similar lenses formed by traditional lathing processes, and in some embodiments, the formed rigid gas permeable ocular lenses 10 may not require further processing after formation in order to achieve the requisite dimensional tolerances and smoothness. Further, the use of an ultra-precise lathe and/or multi-axis mill, as described herein, to form the mold, either directly or via formation of a mold blank and injection molding, allows for the cast rigid gas permeable ocular lenses 10 of the present disclosure to achieve tolerances desired for rigid gas permeable ocular lenses that may only have been achievable previously by directly lathing the rigid gas permeable ocular lens. It was not contemplated that such precisely shaped rigid gas permeable ocular lenses could be formed by methods other than lathing without requiring, for example, post formation processing, such as further lathing, polishing, or the like.

Figure 5:
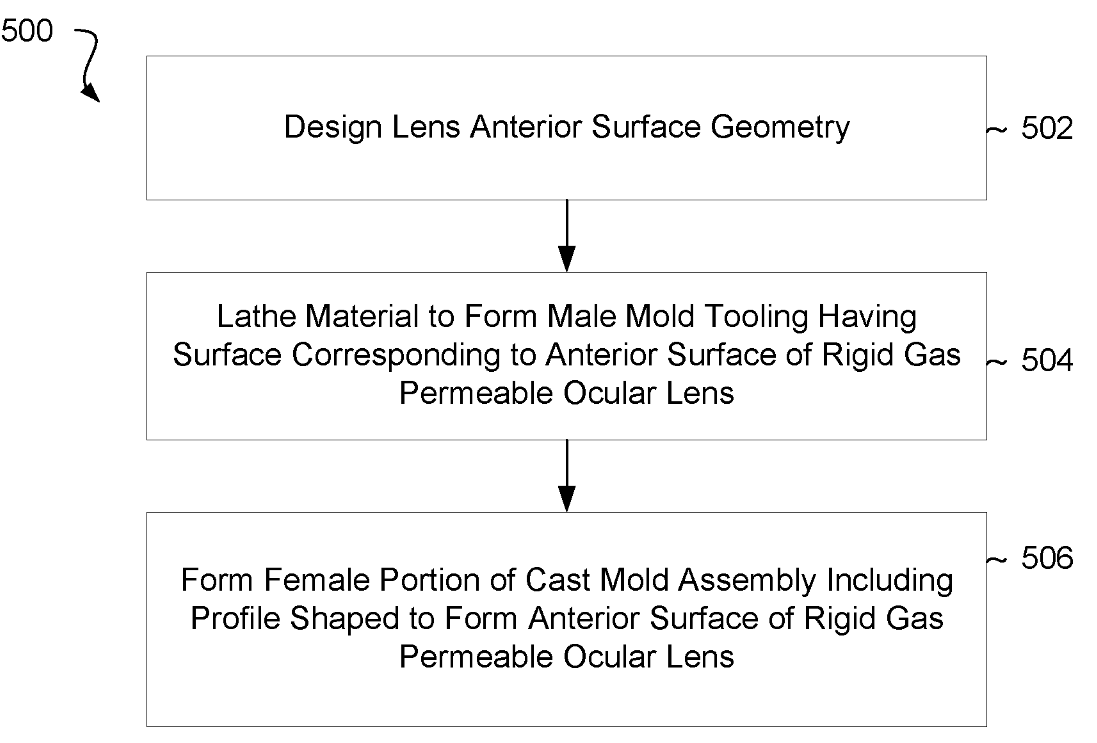
FIG. 5 is a flowchart illustrating a method for forming a female portion of a cast mold assembly for molding a rigid gas permeable ocular lens, according to the principles of the present disclosure.

FIG. 5 illustrates an exemplary method for forming the female portion of the cast mold assembly used to form the rigid gas permeable ocular lenses 10. As illustrated, the anterior surface geometry of the contact lens is designed (step 502). As mentioned previously, the use of complex and smooth lathes and multi-axis milling machines allow for the design of rotationally non-symmetrical geometries and shaping factors, previously unachievable. This allows for the design to include an imprinting effect on the user. When imprinting or modifying the geometry of a user's cornea, the benefit of repeatability provided by the present exemplary systems and methods is critical for best results.

Once the anterior surface geometry is designed, the design may be provided to a lathe and/or multi-axis milling machine to machine a mold material, such as tool steel, to form the male mold tooling, having a surface corresponding to the designed anterior surface of the rigid gas permeable ocular lens (step 504). As noted above, the high axis milling machines mentioned above allow for satisfying the very high tolerances required for orthokeratology lenses (plus or minus 3-5 microns).

When the mold tooling is completed, the tooling can be incorporated into an injection molding system to form the female portion of the cast mold assembly, including the profile shaped to form the anterior surface of the rigid gas permeable ocular lens (step 506).

Figure 6:
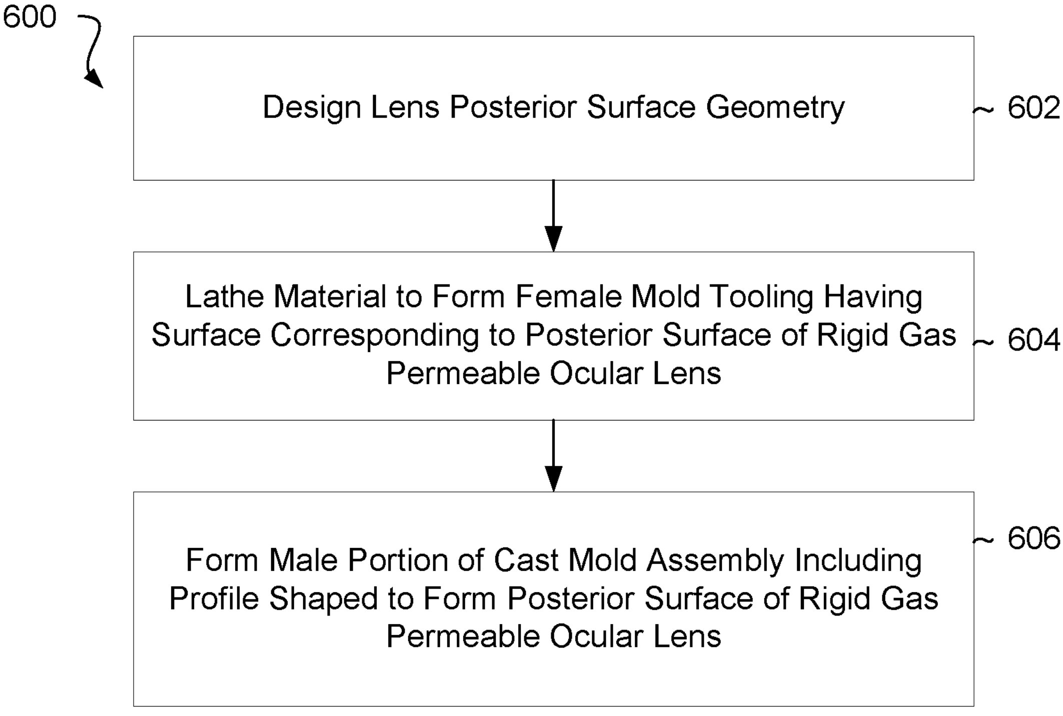
FIG. 6 is a flowchart illustrating a method for forming a male portion of a cast mold assembly for molding a rigid gas permeable ocular lens, according to the principles of the present disclosure.

Similarly, as illustrated in FIG. 6, the corresponding male portion of the cast mold assembly can be formed by first designing the lens posterior surface geometry (step 602), machining the mold material to form a female mold tooling having a surface corresponding to the designed posterior surface of the rigid gas permeable ocular lens (step 604), and forming the male portion of the cast mold assembly including a profile shaped to form the posterior surface of the rigid gas permeable ocular lens (step 606).

A precise machining and forming methodology may be used to form the male mold tooling including, but in no way limited to, DAC ophthalmic lathes, Optoform ophthalmic lathes, FTS tooling, 5-axis diamond milling, 3-dimensional nano-printing, nanolithography, fused deposition, and the like. In some embodiments, the male mold tooling may be formed by a computer controllable lathe, such as an Optoform ultra-precision lathe (models 30, 40, 50, and/or 80), available from Sterling Ultra Precision, located at 8600 Somerset Drive, Largo, Florida. In some embodiments, the machine used to form the male mold tooling may have a positioning resolution of 10 nanometers or less. In some embodiments, the lathing process is precise enough that the male mold tooling has the desired surface characteristics to form a rigid gas permeable ocular lens 10 as described herein without further additional treatment of the male mold tooling, such as grinding, honing, lapping, or polishing.

Figure 7:
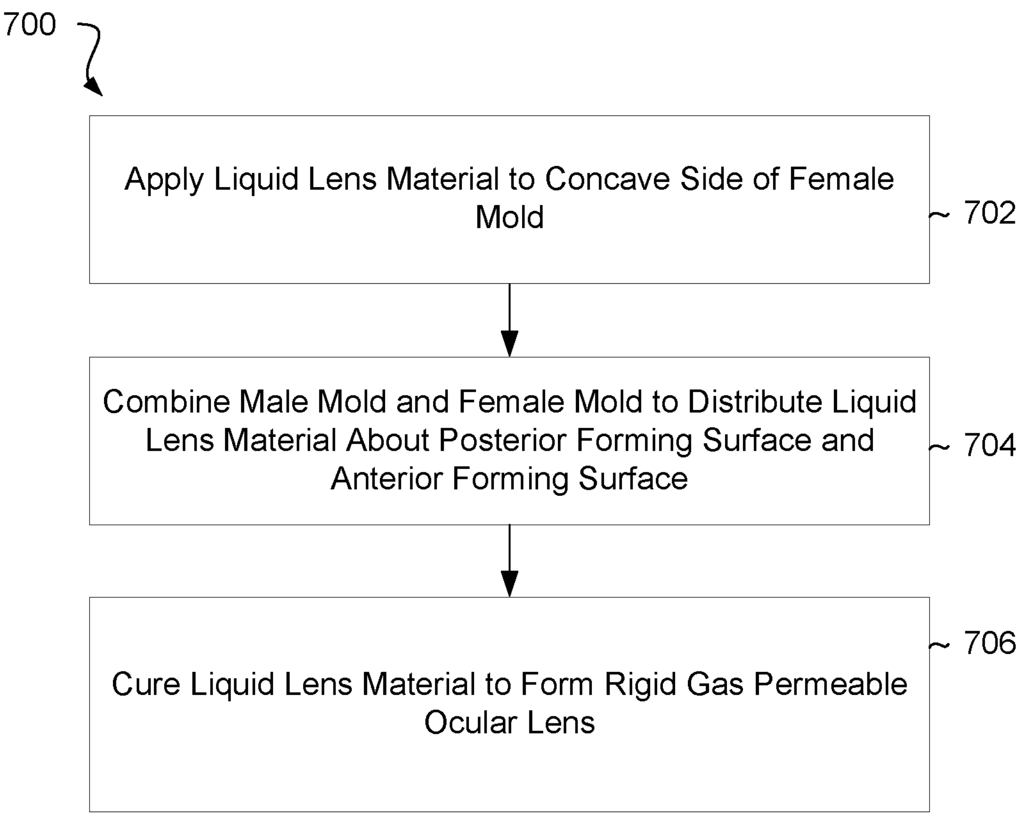
FIG. 7 is a flowchart illustrating an exemplary method for cast molding a rigid gas permeable ocular lens, according to the principles of the present disclosure.

As shown in FIG. 7, once both portions of the cast mold assembly are manufactured, the lens formation method 700 can begin by depositing a liquid lens material into the concave side of the female mold (step 702). The male mold member 300 and the female mold member 304 can then be combined to distribute the liquid lens material about the posterior forming surface and the anterior forming surface of the molds (step 704). Once assembled, the liquid lens material can be cured, via any number of curing mechanisms, to form the rigid gas permeable ocular lens (step 706).

Figure 8:
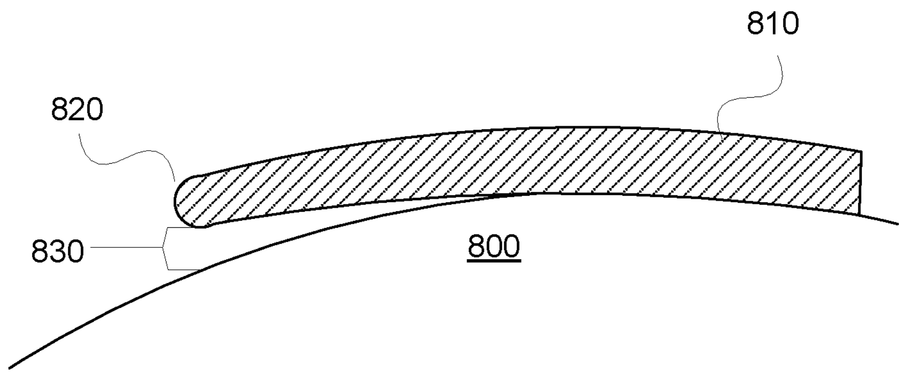
FIG. 8 is a cross-sectional view of an interface between a user's cornea and a molded rigid gas permeable ocular lens, according to the principles of the present disclosure.

FIG. 8 illustrates a cross-sectional view of the rigid gas permeable ocular lens 810 interacting with the cornea 800 of a user during use. While traditional soft contact lenses extended past the cornea and included an edge that was at least partially under the user's lid for the majority of the time, orthokeratology lenses are smaller and will directly engage the user's eyelid each time the user blinks. This configuration results in much more lid/edge engagement. Due to this increased eyelid engagement, traditional rigid gas permeable ocular lenses 810 were hand ground, polished, and finished for comfort. Similarly, the surface finish and quality of the edge 820 impacts user comfort. Moreover, in order to prevent cornea damage and discomfort, a cornea spacing 830 should be designed and formed into the rigid gas permeable lens. According to one exemplary embodiment, the surface roughness $R_a$ of the molded rigid gas permeable ocular lens is less than about 15 nanometers, less than about 10 nanometers, less than about 5 nanometers, less than about 4 nanometers, less than about 3 nanometers, less than about 2 nanometers, or less that about 1 nanometer or less. Additionally, the cornea spacing 830 is at least 2 nanometers, or more.

Figure 9:
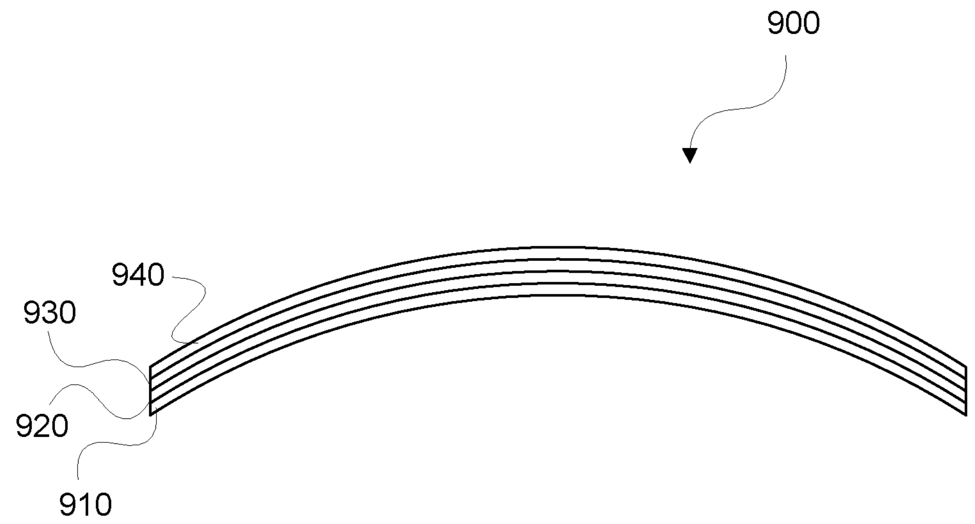
FIG. 9 is a cross-sectional view of a rigid gas permeable ocular lens formed as a stacked array, according to the principles of the present disclosure.

In addition to the enhanced tolerances and complex rotationally nonsymmetrical designs that can be imprinted on the molded rigid gas permeable ocular lens, the molding of rigid gas permeable ocular lenses allows for additional design capabilities. As illustrated in FIG. 9, a molded multi-layer rigid gas permeable ocular lens 900 can be formed having varying properties. According to one exemplary embodiment, separate molded layers 910, 920, 930, 940 can be molded and at least partially cured before the formation of a subsequent layer. According to one exemplary embodiment, the liquid lens material is at least partially cured to form the rigid gas permeable ocular lens. In some embodiments, at least partially curing separate molded layers of the liquid lens material may include exposing the liquid lens material to a curing agent as described herein, for example actinic radiation. In some embodiments, the formed rigid gas permeable ocular lens may have the smoothness and dimensional tolerance characteristics as described herein, for example the rigid gas permeable ocular lens may have at least one surface having an $R_a$ surface roughness of less than about 5 nanometers. Once fully cured, the multi-layer rigid gas permeable ocular lens 900 can have layers with different diffractive indexes, diffractive arrays, features, powers, material properties, stiffness, and the like. According to one exemplary embodiment, additional elements may be introduced into the layers of the multi-layer rigid gas permeable ocular lens 900 where they are then encapsulated in the final cured rigid gas permeable ocular lens.

Molding the present rigid gas permeable ocular lenses provides a number of advantages over traditionally lathe cut rigid gas permeable ocular lenses. Specifically, the present molding process provides an increased level of consistency to the end contact lens. When lathing a solid button to form a traditional rigid gas permeable ocular lens, each lens is different. Each cut imparts varying degrees of thermal energy into the lens, along with differing button compositions, leads to slightly differing parameters for each lathed lens. Additionally, every time a cut is performed, the baseline for the lens is shifted. Additionally, any change in prescription or designed orthokeratology treatment would necessitate the lathing of a new lens, which often times has a relatively long lead time. Moreover, due to the high cost and long lead time of traditional rigid gas permeable lenses, users will typically wear them for long periods of time. Lenses that are used for such long extended periods of time often experience some shrinkage and damage, resulting in a diminishing or less than optimal desired effect over time.

In contrast, the molded rigid gas permeable lenses disclosed herein are less expensive to manufacture and result in a more consistent finished lens because the processes used to manufacture the lenses can be optimized for finis, can be iterative and repeatable, and can be performed quickly. The reduced manufacturing time and effort, as well as the reduced cost, allows for more frequent replacement of the lens to the patient. Consequently, the shrinkage and damage typically experienced by traditional rigid gas permeable lenses can be eliminated.

Furthermore, the repeatability and precision afforded the present method is especially beneficial to orthokeratology lenses. Flexibility to make precise and controllable changes to the contact lens design for rigid gas permeable orthokeratology lenses allows doctors to more dynamically and controllably effect shape changes to a patient's eye. That is, an optometrist can, based on selective testing and monitoring, vary or tune the aggression with which they pursue an ocular shape change via the Jesson effect. Aggressively changing the oblate shape, may allow more light into the patient's eye (to control myopic axial growth), but may be too aggressive to do all the time, so the practitioner may iteratively vary the level of aggression. This variation is possible and practical due to the accuracy, repeatability, and cost benefit of the preset methods.

Figure 10:
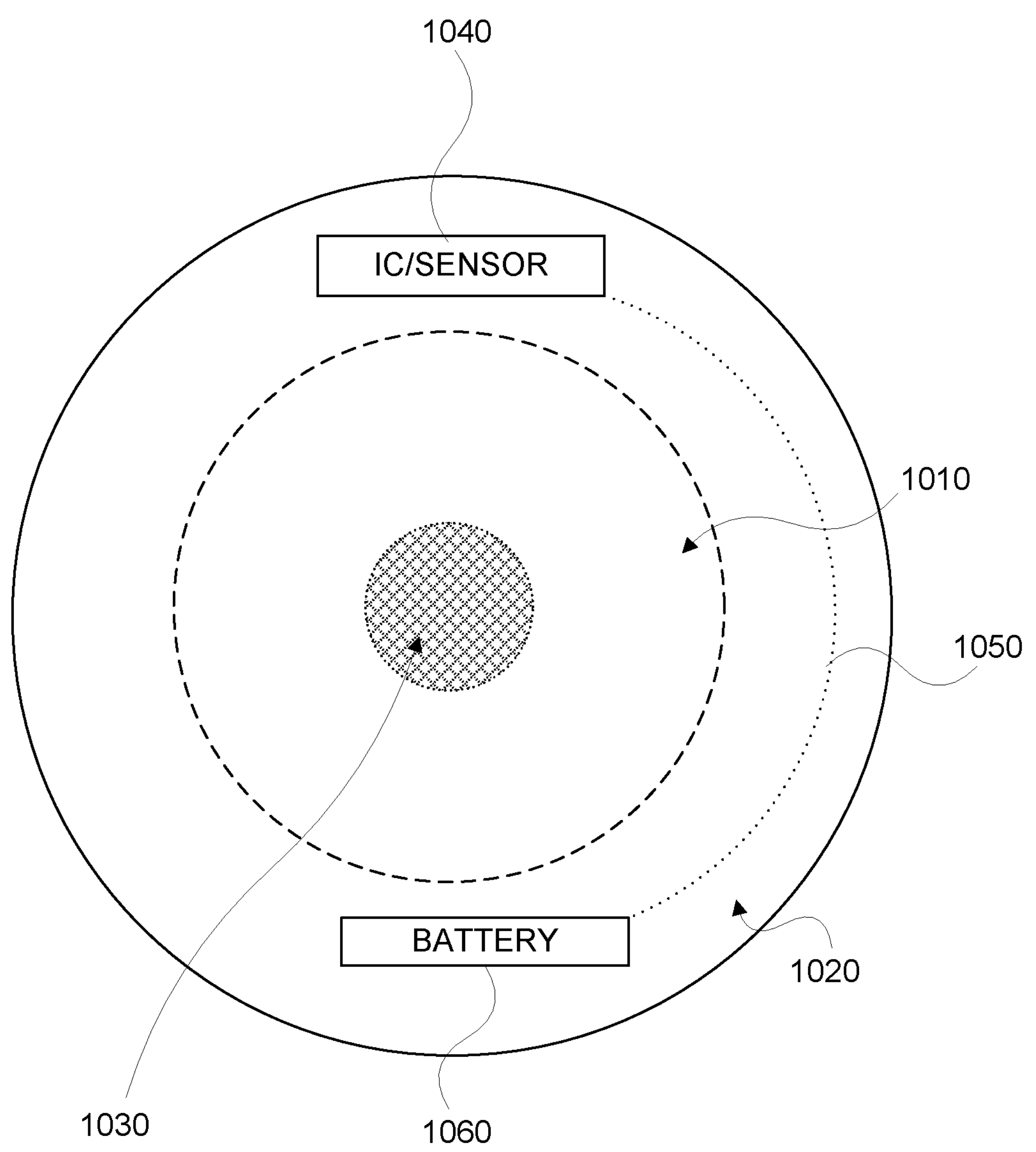
FIG. 10 is a top view of a molded rigid gas permeable scleral lens, according to the principles of the present disclosure.

Additionally, as illustrated in FIG. 10, the present exemplary systems and methods are not solely limited to rigid gas permeable ocular lenses intended to be used for orthokeratology. Rather, the present exemplary systems and methods can be used to form rigid gas permeable ocular lens that include optic zones and non-optic zones. According to one exemplary embodiment, the present systems and methods can be used to form a scleral rigid gas permeable ocular lens 1000. As shown, the scleral rigid gas permeable ocular lens 100 includes a pupil zone 1030 and a corneal zone 1010 that encompass an optic zone. Additionally, a scleral zone 1020 is provided outside the optic zone. By using the present exemplary systems and methods to manufacture a scleral rigid gas permeable ocular lens, additional space outside the optic zone is achieved, wherein additional elements may be embedded in the lens to facilitate functionality of a smart contact lens. For example, as illustrate din FIG. 10, an integrated circuit, a sensor, or another sensing or computing device 1040 may be embedded within the scleral zone 1020 of the scleral rigid gas permeable ocular lens 1000. According to this exemplary embodiment, the integrated circuit, a sensor, or another sensing or computing device 1040 can be embedded between layers of the scleral rigid gas permeable ocular lens 1000. The rigidity of the scleral rigid gas permeable ocular lens 1000 serves to protect the integrity of the integrated circuit, sensor, or other sensing or computing device 1040, and may prolong its useful life. Additionally, the integrated circuit, sensor, or other sensing or computing device 1040 can be communicatively coupled via a conductive via 1050, also located in the scleral zone 1020, to a power supply 1060 or other electrical components. Any number of elements could be embedded within the scleral zone 1020 including, but in no way limited to, communication devices, sensors, lighting devices, diffractive arrays, and the like.

While some of the examples described above have been described with specific reference to forming a rigid gas permeable ocular lens from a cast molding process, any appropriate casting or molding process may be used to form a rigid gas permeable ocular lens in accordance with the present disclosure. For example, in some embodiments, a rigid gas permeable ocular lens may be formed by spin casting. Additionally, the present exemplary systems and methods may be used to manufacture intraocular lenses, and the like.

The present exemplary systems and methods leverage multi-axis milling machines to satisfy the necessarily high tolerance requirements for rigid gas permeable ocular lenses, particularly, those lenses that are contacting and reshaping the cornea. The present systems and methods allow for rigid gas permeable ocular lenses to be formed with unique materials that have lower viscosity and lower surface tension characteristics in monomer form to provide flow within the mold during manufacture. Additionally, higher $D_k$ values can be achieved with moldable materials, compared to strictly lathe-able rigid gas permeable materials, such as combinations of syloxanylstyrene and fluoromethacrylate. The present moldable materials can exhibit $D_k$ values greater than 50, greater than 100, and/or greater than 150, according to the units noted in ANSI Z80.20. Additionally, the present molding techniques for forming rigid gas permeable ocular lenses provides for better surface properties and physical finishes on the lens when compared to traditional lathed lenses. Molding also provides less inherent material stress (which is introduced during lathing traditional rigid gas permeable lenses). The reduction in material stresses manifests itself in improved wetting and shape retention because there is less warpage of the lens. Furthermore, by molding the rigid gas permeable ocular lenses, additional materials can be added to the lens material without concern of how the added materials will affect the lathing process. For example, surface modifiers can be added and molded directly into the lens. Furthermore, differing front and back surface finishes can be designed and introduced to the rigid gas permeable ocular lens via the mold.

Molding also allows for previously unachievable complex surface shapes, which may encourage rotation of the lens, tear exchange, prevent overnight binding, and the like. Further, elements such as fenestrations of varying shapes, circular, radial, linear, etc. can be molded into the lens itself.

Molding also allows for a laminated or layered configuration which provides for possible inclusion of alternate materials in a single rigid gas permeable ocular lens. Included layers may include, but are in no way limited to, color modifiers, refractive index modifiers, drug delivery options such as atropine, pirenzipine, and the like.

The present exemplary systems allow for advantages over traditional overnight orthokeratology lathed lenses, including, but in no way limited to, consistent geometry from lens to lens to provide enhanced imprint effect on the user's eye, maintaining the shaping factor between lenses and the ability to form high order shaping factors compared to traditionally lathed lenses; the ability to form rotationally non-symmetric shapes and edge forms that better fit the eye, enhancing user comfort. Edge forms and peripheral shape factors can be accomplished and thinner, smoother edge shapes can be achieved when compared to the lathing of rigid gas permeable ocular lenses.

The terms recited in the claims should be given their ordinary and customary meaning as determined by reference to relevant entries in widely used general dictionaries and/or relevant technical dictionaries, commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used in a manner that is more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "herein this term means," "as defined herein," "for the purposes of this disclosure the term shall mean," etc.).

References to specific examples, use of "i.e.," use of the word "invention," etc., are not meant to invoke exception (b) or otherwise restrict the scope of the recited claim terms. Other than situations where exception (b) applies, nothing contained herein should be considered a disclaimer or disavowal of claim scope.

The subject matter recited in the claims is not coextensive with and should not be interpreted to be coextensive with any particular embodiment, feature, or combination of features shown herein. This is true even if only a single embodiment of the particular feature or combination of features is illustrated and described herein. Thus, the appended claims should be given their broadest interpretation in view of the prior art and the meaning of the claim terms.

As used herein, spatial or directional terms, such as "left," "right," "front," "back," and the like, relate to the subject matter as it is shown in the drawings. However, it is to be understood that the described subject matter may assume various alternative orientations and, accordingly, such terms are not to be considered as limiting.

Articles such as "the," "a," and "an" can connote the singular or plural. Also, the word "or" when used without a preceding "either" (or other similar language indicating that "or" is unequivocally meant to be exclusive—e.g., only one of x or y, etc.) shall be interpreted to be inclusive (e.g., "x or y" means one or both x or y).

The term "and/or" shall also be interpreted to be inclusive (e.g., "x and/or y" means one or both x or y). In situations where "and/or" or "or" are used as a conjunction for a group of three or more items, the group should be interpreted to include one item alone, all of the items together, or any combination or number of the items. Moreover, terms used in the specification and claims such as have, having, include, and including should be construed to be synonymous with the terms comprise and comprising.

Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques.

All ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. A method of forming a rigid gas permeable orthokeratology lens, comprising:

forming at least a portion of a contact lens mold including a first surface having a profile shaped to form an anterior surface of the orthokeratology lens;

forming at least a portion of the contact lens mold including a second surface having a profile shaped to form a posterior surface of the orthokeratology lens;

applying a liquid lens material between the first surface and the second surface of the contact lens mold; and curing the liquid lens material in the contact lens mold to form the orthokeratology lens, wherein the contact lens mold has surface characteristics to form the rigid gas permeable orthokeratology lens having:

an apical clearance between the posterior surface of the orthokeratology lens and a cornea of an eye of between 5 μm and 40 μm, an aspheric alignment zone, a peripheral zone adjacent the aspheric alignment zone and configured to provide edge lift at a periphery of the cornea of the eye, wherein an outer edge of the peripheral zone is configured to be within the periphery of the cornea of the eye, and a modulus greater than 500 Mpa.

2. The method of claim 1, further comprising cast molding the rigid gas permeable orthokeratology lens.

3. The method of claim 1, wherein at least partially curing the liquid lens material comprises exposing the liquid lens material to actinic radiation.

4. The method of claim 1, wherein:

forming at least the portion of the contact lens mold including the first surface comprises:

machining a first blank to form the male mold tooling having a first mold surface corresponding to the anterior surface of the orthokeratology lens; and injection molding the portion of the contact lens mold using the male mold tooling to form the portion of the contact lens mold including the first surface; and forming at least the portion of the contact lens mold including the second surface comprises:

machining a second blank to form a female mold tooling having a second mold surface corresponding to the posterior surface of the orthokeratology lens; and injection molding the portion of the contact lens mold using the female mold tooling to form the portion of the contact lens mold including the second surface.

5. The method of claim 4, wherein machining the first blank and the second blank comprises using a multi-axis milling machine having a positioning resolution of less than about 10 nanometers.

6. The method of claim 1, wherein a radius of curvature of a back optic zone of the rigid gas permeable orthokeratology lens has a dimensional tolerance equal to or less than about 0.005 millimeters.

7. The method of claim 1, wherein:

the liquid lens material comprises an isotropic material having a viscosity of between 1,000 and 5,000 cps at 20° C.

8. A method of forming a rigid gas permeable orthokeratology lens, comprising:

providing a mold including a first side having a profile shaped to form a posterior surface of the rigid gas permeable orthokeratology lens;

dispensing a liquid lens material to the first side of the portion of the mold; and at least partially curing the liquid lens material to form the rigid gas permeable orthokeratology lens;

wherein:

the rigid gas permeable orthokeratology lens has:

a modulus greater than 500 Mpa, an apical clearance between the posterior surface and a cornea of an eye of between 5 μm and 40 μm, an aspheric alignment zone, and a peripheral zone adjacent to the aspheric alignment zone configured to provide edge lift at a periphery of the cornea of the eye, wherein a peripheral edge of the rigid gas permeable orthokeratology lens overlies the cornea of the eye.

9. The method of claim 8, further comprising cast molding the rigid gas permeable orthokeratology lens.

10. The method of claim 1, wherein the aspheric alignment zone is configured to accommodate a wider range of patients.

11. The method of claim 8, wherein the aspheric alignment zone is configured to accommodate a wider range of patients.

* * * * *